United States Patent [19]

Bemis et al.

[11] Patent Number: 4,769,199
[45] Date of Patent: Sep. 6, 1988

[54] PROCESS OF MAKING PLASTIC HINGE FOR RACEWAY

[75] Inventors: Peter F. Bemis; Dan Cykana, both of Sheboygan, Wis.

[73] Assignee: Haworth, Inc., Holland, Mich.

[21] Appl. No.: 629

[22] Filed: Jan. 6, 1987

[51] Int. Cl.$^4$ .................. B28B 11/16; B32B 3/02; B32B 31/00
[52] U.S. Cl. .................. 264/139; 264/145; 428/126; 428/167; 428/192; 428/217
[58] Field of Search ........... 428/83, 156, 167, 173, 428/217, 121, 126, 192; 264/139, 145, 141, 142

[56] References Cited

U.S. PATENT DOCUMENTS

| | | | |
|---|---|---|---|
| 3,634,182 | 1/1972 | Biglin et al. | 428/156 |
| 4,157,413 | 6/1979 | Ruhl | 428/159 |
| 4,209,043 | 6/1980 | Menzel | 138/154 |
| 4,277,123 | 7/1981 | Haworth et al. | 339/22 R |
| 4,391,303 | 7/1983 | Holgersson | 428/167 |
| 4,463,046 | 7/1984 | Hutchison et al. | 428/156 |
| 4,596,098 | 6/1986 | Finkbeiner et al. | 52/220 |

Primary Examiner—William J. Van Balen
Attorney, Agent, or Firm—Flynn, Thiel, Boutell & Tanis

[57] ABSTRACT

A U-shaped raceway having bottom and side walls formed as substantially rigid plastic panels, and flexible plastic hinges integrally joined between the lower edges of the side walls and the adjacent edges of the bottom wall. The plastic hinges are soft and flexible, and of substantially less hardness than the walls. The plastic hinges extend across the thickness of the walls. The raceway is formed as a dual extrusion so that the hinges are integrally joined to the rigid walls. During the extruding step, a rigid bridge structure is also extruded so as to span transversely across the hinge outwardly from one of the surfaces of the panels to maintain dimensional stability across the hinge. The bridge structure is severed from the panels following the extrusion operation.

4 Claims, 2 Drawing Sheets

PROCESS OF MAKING PLASTIC HINGE FOR RACEWAY

FIELD OF THE INVENTION

This invention relates to an improved raceway constructed of a relatively rigid synthetic resin having an integral hinge of flexible synthetic resin, and an improved method of manufacturing the raceway so as to permit maintaining of close dimensional tolerances.

BACKGROUND OF THE INVENTION

The office furniture industry has, in recent years, extensively utilized systems employing serially-connected upright wall panels having channel-like raceways secured along the lower edges thereof for confining electrical and/or communication cables. These raceways have assumed many forms and configurations, but have typically required either openable or removable side covers so as to provide access to the interior of the raceway. One such system is disclosed in U.S. Pat. No. 4,277,123, owned by the assignee of this application.

To improve upon the structure of such raceway, attempts have been made to mold the raceway as an integral one-piece arrangement employing integral hinges associated with the lower corner so as to permit the side walls of the raceway to be selectively pivotally moved and hence function as openable side covers. One such raceway is illustrated by U.S. Pat. No. 4,463,046. This latter patent discloses a one-piece molded raceway of channel-like configuration having side and bottom walls of a rigid plastics material, with flexible plastic hinges being integrally molded in the channel at the lower corners. The hinges are of a laminate construction in that the rigid material of the walls defines an inner layer having a longitudinally extending notch therein, and an outer layer of a more flexible plastic material is disposed directly thereover, this laminate being integrally molded in a single operation. By flexing the side wall, this effects breakage of the rigid inner layer along the notch, and hence permits the outer more flexible layer to function as a so called "living" hinge. The hinge arrangement of this patent is desirable since the rigid inner layer does permit the dimensional tolerances of the raceway to be rather precisely maintained during the extrusion process. However, assembly of the raceway on the panel is difficult since the installer must initially break each hinge (i.e., break the inner layer) before installing the raceway on the panel. Further, after the hinge is broken, the resulting hinge is formed solely by the outer flexible layer, which layer has a thickness which is only about one-half the thickness of the wall structure defining the raceway. Such hinge is thus believed to possess a much shorter life in terms of the number of successful flexing cycles which it is capable of performing. Also, the side cover always tends to swing back toward its closed position, and hence this interfers with the installing of cables into the raceway.

Accordingly, the present invention relates to a raceway of the aforementioned type, which raceway is believed to represent an improvement over known structures of this type. This invention also relates to an improved method of making the raceway so as to provide for close dimensional tolerances during the manufacturing process, while at the same time resulting in a raceway having an integral hinge possessing significantly improved flexibility and life.

In the improved raceway of the present invention, the rigid plastic side covers are joined to the rigid plastic bottom wall through integral plastic hinges which are flexible. The hinges extend across the complete thickness of the raceway wall so as to optimize both the securement of the flexible hinge material to the rigid wall material, and at the same time optimize the life and flexibility of the hinge. The hinge of flexible material has, in the preferred embodiment, a configuration which provides an increased mass of flexible material (i.e. increased width) adjacent one side of the raceway wall in relationship to the other side so as to provide increased flexible capability adjacent one side of the raceway, which in effect define an imaginary hingepoint adjacent the other side of the raceway wall to thereby more readily accommodate the flexing of the side cover relative to the bottom wall.

The improved raceway of this invention is manufactured by an improved process wherein the raceway is initially formed, as by an extrusion technique, in one piece so that the rigid plastic walls and the hinges of flexible plastic material are integrally joined together during the extrusion process. The hinge initially has an extension which projects outwardly beyond one of the side surfaces of the raceway, and this extension is surrounded by a channel-like bridge of rigid plastic material which integrally joins to the rigid plastic panels on opposite sides of the flexible hinge. This bridge and extension are formed integrally with the raceway during the extrusion step so that the rigid bridge maintains close dimensional tolerances across the flexible hinge. Upon discharge from the extruder, and while the extrusion is still warm and relatively soft, the extruded raceway is moved directly past a cutting device which severs the rigid bridge and the flexible extension from the raceway so as to leave a substantially flush surface, whereby the flexible hinge then extends across the full thickness of the raceway and the adjacent rigid panels are integrally joined together solely through the intermediate flexible hinge.

Other objects and purposes of the invention will be apparent to persons familiar with structures of this general type upon reading the following specification and inspecting the accompanying drawings.

Figure 1:
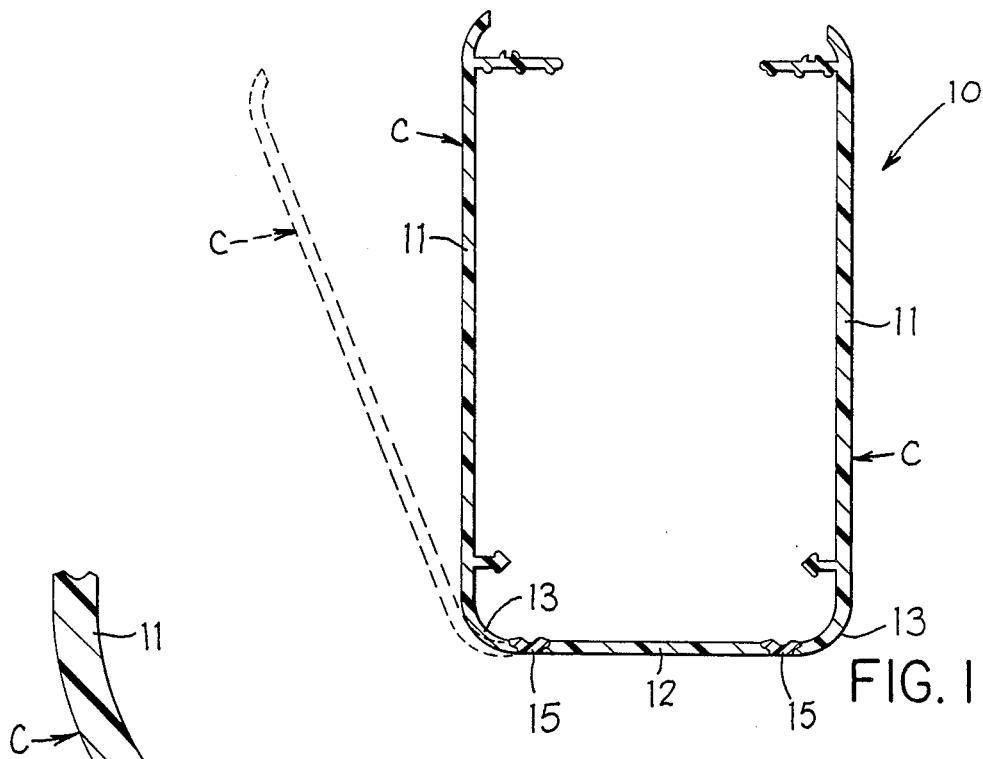
FIG. 1 is a transverse, vertical cross-sectional view taken through a raceway according to the present invention, one cover of the raceway being flexed or hinged partially outwardly as indicated by dotted lines.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the raceway and designated parts thereof. Said terminology will include the words specifically mentioned, derivatives thereof, and words of similar import.

DETAILED DESCRIPTION

FIG. 1 illustrates a channel or U-shaped raceway 10 adapted to be attached to and extend along the lower edge of an upright space-divider panel, such arrangement being illustrated by aforementioned U.S. Pat. No. 4,277,123. This raceway 10, according to the present invention, is integrally formed in one piece, as by an extrusion process, of synthetic resin, hereinafter merely referred to as plastic.

The raceway 10 includes substantially parallel and vertically projecting side walls or panels 11 joined together by a substantially horizontal bottom wall or panel 12. Side walls 11 have their lower edges integrally interconnected to the bottom wall 12 through curved corner walls 13, the latter defining substantially 90° arcs having their opposite ends tangentially joined to the respectively adjacent ends of the side and bottom walls.

Figure 2:
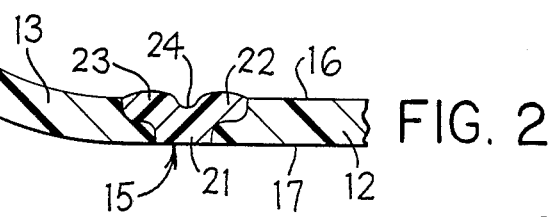
FIG. 2 is an enlarged, fragmentary sectional view taken through one of the hinges which joins the cover to the bottom wall.

As illustrated by FIGS. 1 and 2, the side wall 11 and the respective curved corner wall 13 are integrally joined together to define a single panel of rigid plastic having substantially uniform thickness, this single panel in effect defining the openable side cover C of the raceway 10. The other end of the curved corner wall 13, however, is joined to the adjacent edge of the rigid bottom wall 12 solely through an intermediate flexible hinge 15, the latter being integrally joined between the bottom wall 12 and corner wall 13 at the point of tangential connection between these walls. The bottom wall 12 is also a rigid plastic panel having a thickness substantially identical to that of the cover C. The covers C and the bottom wall 12 are all preferably constructed of a hard or rigid polyvinyl chloride (PVC), although other equivalent hard or rigid plastics could also be utilized. The panels defining the covers C and bottom wall 12 preferably should have a hardness at least about Shore durometer 75D.

Considering now the integral hinge 15 which joins each edge of the bottom wall 12 to a respective cover C, this hinge 15 extends across the full thickness of the raceway wall structure so as to be flush with or extend outwardly beyond the respective interior and exterior surfaces 16 and 17. The hinge 15, in the preferred embodiment illustrated by FIG. 2, is generally T-shaped in cross section. More specifically, the hinge 15 has a narrow stem part 21 which is flush with the outer raceway surface 17 and which projects outwardly through only a portion (about one-half) of the panel thickness. This narrow part 21 in turn integrally joins with a wide head part 22 which projects through the remaining thickness of the panel wall so as to effectively terminate at the inner surface 16 thereof. This wide part 22 hence provides an increased quantity of flexible hinge material adjacent the inner surface 16 of the raceway. The wide part 22, in this preferred embodiment, preferably has a rounded cap 23 which is integral with the wide part 22. This cap 23 has a rounded convex exterior surface which projects upwardly above the inner wall 16 through a small extent.

Figure 3:
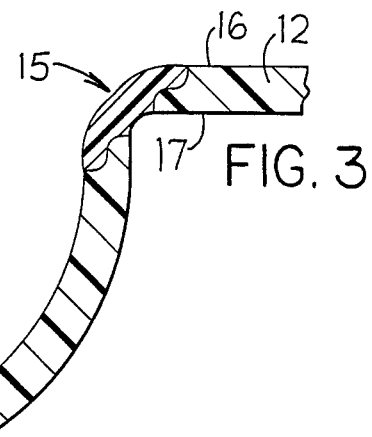
FIG. 3 shows the hinge of FIG. 2 but with the cover in an open position.

The wide head part 22 preferably has a shallow notch or groove 24 formed therein. This groove is positioned centrally directly over the narrow part 21, and extends along the hinge 15 in the longitudinal direction of the raceway. This groove 24 facilitates the sketching (i.e. tensioning) of the flexible hinge material of the wide part 22 when the cover is opened, as shown by FIG. 3, since the hinge axis is effectively defined within or adjacent the narrow part 21 (and hence adjacent the outer surface 17).

The hinge 15 is constructed entirely of a relatively soft and flexible plastic material having a hardness which is substantially less than the hardness of the panels 12 and C. The plastic material defining the hinge 15 may be and is preferably composed of the same synthetic resin as that forming the rigid panels 12 and C, such as PVC. In such instance, the plastic of the hinge will be more highly plasticized than the plastic defining the panels so as to provide the hinge with substantially less hardness and greater flexibility. Alternately, the plastic of the hinge 15 may be composed of a chemically different, relatively softer more flexible resin than that used to form the rigid panels 12 and C. When two different species of resins are used, care must be taken to select resins which are adhesively compatible to ensure a truly integral one-piece finished raceway. The selection of such materials is within the capability of those having ordinary skill in this art.

Figure 4:
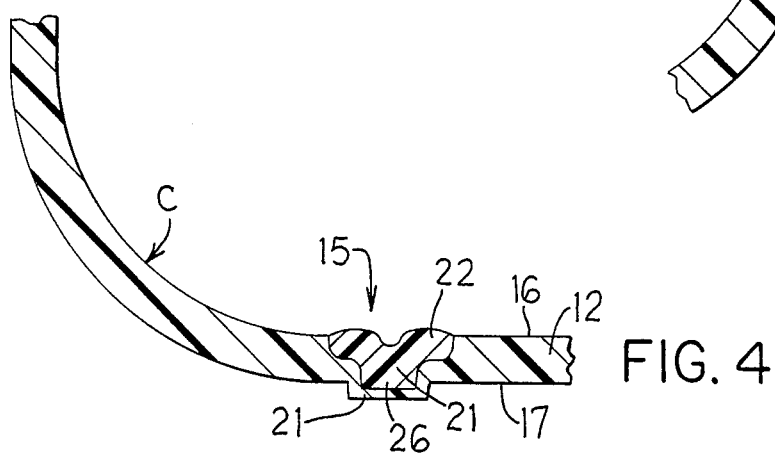
FIG. 4 is a view similar to FIG. 2 but showing the raceway in a transitional form during manufacture thereof, that is, after discharge from the extruder but before engagement with a cutting device.

While the finished raceway 10, in the preferred embodiment, has a configuration corresponding to that illustrated by FIGS. 1 and 2, nevertheless the raceway during an intermediate manufacturing step has a configuration corresponding to that illustrated by FIG. 4. More specifically, the hinge 15 is provided with a portion 26 which is integral with the narrow part 21 but projects outwardly beyond the outer raceway surface 17. This extended portion 26 of the flexible hinge is closely surrounded by a channel-shaped bridge 27 which has the opposite legs thereof integrally joined to the adjacent edges of the rigid panels C and 12. This bridge 27 projects outwardly from the outer raceway surface 17 but is constructed of the same rigid plastic material as the panels C and 12. This hence maintains desired close dimensional tolerances, and specifically controls the dimensions of the hinge 15, during the extrusion process as described below. However, this extended portion 26 and bridge 27 are removed from the raceway immediately following the extrusion operation so as to result in the raceway having the desired configuration illustrated by FIGS. 1 and 2.

Figure 5:
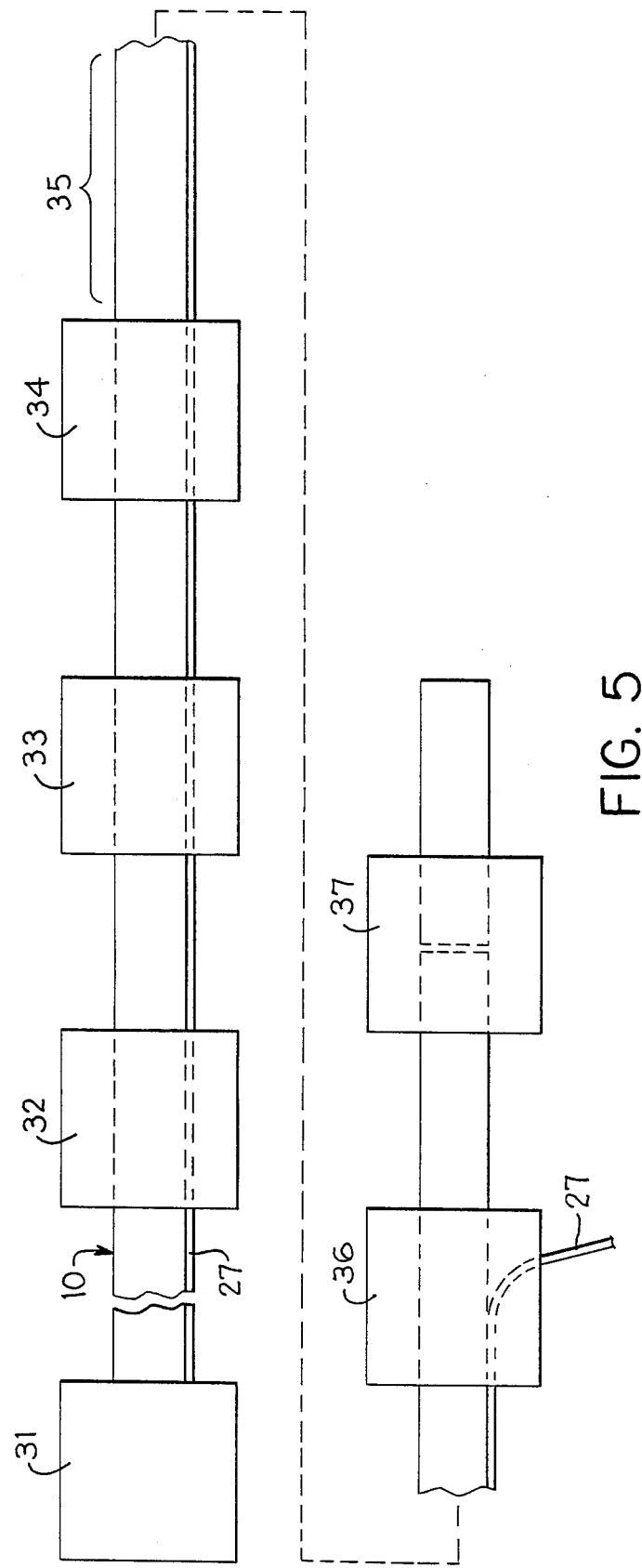
FIG. 5 diagrammatically illustrates the process of forming the raceway.

Considering now the process for forming the raceway 10, reference is made to FIG. 5 wherein this process is diagrammatically illustrated.

The raceway is a dual or coextrusion of two streams or columns of thermoplastic synthetic resin of substantially different durometers or hardness, such coextruders being conventional and thus only diagrammatically illustrated at 31. The raceway 10 in the form as appearing in FIG. 3 is extruded continuously in a long length from the extruder 31 and is thence moved through a calibration station 32 which normally comprises a series of calibrating dies through which the extrusion is moved so as to control and provide the required dimensions of the extrusion. From the calibration station 32 the extrusion moves continuously and is supplied to a cooling station 33, specifically a water quench station, with the extrusion then moving to a drying station 34 to effect removal of excess water. The extrusion then moves from the drying station through a dwell 35, the latter being a selected distance free of other working stations so as to permit additional cooling of the extrusion to permit the plastic of the extrusion to more properly harden or set up. At the end of the dwell, at which time the extrusion has been cooled a substantial degree so as to result in the extrusion being approximately 80 to 90% hardened or set up, the extrusion then moves through a first cutting station 36 which incorporates therein a stationary cutoff die which severs the flexible hinge extension 26 and in the surrounding rigid bridge 27 from the raceway so that the outer surface 17 thereof is substantially flush as illustrated by FIG. 2. After passing through the cutting station 36, the extrusion then moves continuously into and through a further cutting station 37 which comprises appropriate cutoff members which effectively sever the extrusion into raceway sections of selected length.

During the extrusion and subsequent forming process as explained above, the extrusion moves continuously from the extruder through all of the intermediate stations until the extrusion has been severed into raceway sections of selected length. The movement of the extrusion occurs along a straight path at a preferred rate of at least about 30 feet per minute.

With the improved raceway of this invention, such as illustrated by FIGS. 1 and 2, the raceway can be easily stored, handled and shipped in a flat condition, that is, with the covers C folded downwardly so as to be substantially flat with the bottom wall 12. Further, since the flexible hinge 15 extends across the complete thickness of the raceway and has a substantially mass of flexible material disposed adjacent and on opposite sides of the notch, this mass of flexible material hence permits the cover to be folded downwardly through substantially 90° into a horizontal and substantially fully opened position without creating excessive stress within the flexible material of the hinge. In addition, this enables the cover to remain in this fully open or substantially flat position under its own weight so as to greatly facilitate free access to the interior of the raceway when it is assembled on a panel.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A process for forming an elongate plastic article having first and second rigid plastic panels of substantially uniform thickness and integrally joined together by a flexible plastic hinge portion, comprising the steps of:
   extruding first and second sheetlike panels of a rigid plastic material so that the panels have opposed longitudinally-extending edges positioned close to but sidewardly spaced apart;
   coextruding a strip of a soft and flexible plastic material into the longitudinal space defined between the opposed edges of said first and second panels so as to define a flexible portion which is integrally bonded to the opposed edges of the panels and extends across the thickness thereof;
   forming during said first-mentioned extrusion step a rigid plastic bridge structure which spans across the space between the opposed edges but which projects outwardly from side surfaces of the panels and is integrally joined thereto so as to rigidly structurally join the panels together for maintaining dimensional stability;
   said coextrusion step resulting in the flexible portion having a part which projects outwardly beyond the side surfaces of the panels and is surrounded by the bridge structure; and
   thereafter simultaneously severing said bridge structure and said projecting part from said article at a location which is approximately flush with said side surfaces so that said panels are integrally interconnected solely through said flexible portion.

2. A process according to claim 1, including the step of forming a groove longitudinally along the flexible portion with said groove opening inwardly from an exposed surface of the flexible portion which is on the opposite side of said article from said bridge structure, said groove having a shallow depth so as to project across only a small fraction of the thickness of said flexible portion.

3. A process according to claim 1, including the steps of passing said article, after completion of said extrusion and coextrusion steps, through calibrating means for controlling the cross-sectional dimensions of the article;
   thereafter quenching said article to effect cooling and setting up thereof; and
   thereafter affecting said severing step.

4. A process according to claim 3, wherein said article moves continuously along a substantially linear path at a substantially uniform speed as it is extruded and thereafter is subjected to the calibrating, quenching and severing steps.

* * * * *